(12) United States Patent
Watanabe

(10) Patent No.: US 12,235,926 B2
(45) Date of Patent: Feb. 25, 2025

(54) OPTIMIZATION APPARATUS AND OPTIMIZATION METHOD

(71) Applicant: FUJITSU LIMITED, Kawasaki (JP)

(72) Inventor: Yasuhiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 521 days.

(21) Appl. No.: 17/141,237

(22) Filed: Jan. 5, 2021

(65) Prior Publication Data
US 2021/0256090 A1      Aug. 19, 2021

(30) Foreign Application Priority Data
Feb. 19, 2020   (JP) ................................ 2020-026340

(51) Int. Cl.
*G06N 10/00*      (2022.01)
*G06F 17/11*      (2006.01)
*G06N 3/04*       (2023.01)

(52) U.S. Cl.
CPC .............. *G06F 17/11* (2013.01); *G06N 3/04* (2013.01)

(58) Field of Classification Search
CPC .......... G06N 3/04; G06N 10/40; G06N 10/00; G06N 5/01; G06N 7/01; G06F 17/11; G06F 30/30; G06Q 10/04
See application file for complete search history.

(56) References Cited

U.S. PATENT DOCUMENTS

| 2016/0063391 | A1 | 3/2016 | Hayashi et al. |
| 2018/0349325 | A1 | 12/2018 | Okuyama et al. |
| 2019/0278829 | A1 | 9/2019 | Takatsu |
| 2019/0286981 | A1 | 9/2019 | Ahmed |

FOREIGN PATENT DOCUMENTS

| JP | 2016-51350 A | 4/2016 |
| JP | 2018-206127 A | 12/2018 |

OTHER PUBLICATIONS

Giacomo Zanella ("Informed proposals for local MCMC in discrete spaces," https://arxiv.org/pdf/1711.07424.pdf, arXiv: 1711.07424v1 [stat.CO] Nov. 20, 2017, pp. 1-34) (Year: 2017).*

(Continued)

*Primary Examiner* — Li Wu Chang
(74) *Attorney, Agent, or Firm* — XSENSUS LLP

(57) ABSTRACT

An optimization apparatus includes: Ising machines that each search for a solution of a subproblem among subproblems obtained by dividing a problem represented by an Ising model, each of the Ising machines including: a memory configured to store values of a state variable set corresponding to a subproblem to be calculated for a plurality of groups; a processor configured to: perform processing of calculating a second solution candidate for each of the plurality of groups based on first solution candidates of subproblems calculated by other Ising machines by changing a group to be processed for every unit period such that the second solution candidate is calculated for the state variable set of a group different from groups processed by the other Ising machines in a same unit period; and a communication circuit configured to transmit the second solution candidate to the other Ising machines every time the unit period ends.

20 Claims, 12 Drawing Sheets

(56) References Cited

OTHER PUBLICATIONS

Rams et al. ("Heuristic optimization and sampling with tensor networks," https://arxiv.org/pdf/1811.06518v3.pdf, arXiv: 1811.06518v3 [cond-mat.stat-mech], Jun. 21, 2019, pp. 1-14) (Year: 2019).*
Thomas et al. ("Exact Algorithm for Sampling the 2D ISing Spin Glass", https://arxiv.org/abs/0906.5519, arXiv:0906.5519v2 [cond-mat.dis-nn], 2009, pp. 1-80) (Year: 2009).*
Extended European Search Report issued Jul. 8, 2021, in corresponding European Patent Application No. 21150104.4.
Replacement Extended European Search Report issued Aug. 27, 2021, in corresponding European Patent Application No. 21150104.4.
Marek M. Rams et al., "Heuristic optimization and sampling with tensor networks", http: //arxiv.org/pdf/1811.06518v3, arXiv:1811.06518v3[cond-mat.stat-mech], Jun. 21, 2019, 14pp.
Chinese Office Action issued Feb. 6, 2024, in corresponding Chinese Patent Application No. 202110056655.0, 22pp.
Communication pursuant to Article 94(3) EPC issued Apr. 17, 2024, in corresponding European Patent Application No. 21 150 104.4, 5pp.

\* cited by examiner

FIG. 5

| | ISING MACHINE 21 | ISING MACHINE 22 | ISING MACHINE 23 | ISING MACHINE 24 |
|---|---|---|---|---|
| STATE { REPLICA GROUP 0 / REPLICA GROUP 1 / REPLICA GROUP 2 / REPLICA GROUP 3 | X0 / X0-g0 / X0-g1 / X0-g2 / X0-g3 | X1 / X1-g0 / X1-g1 / X1-g2 / X1-g3 | X2 / X2-g0 / X2-g1 / X2-g2 / X2-g3 | X3 / X3-g0 / X3-g1 / X3-g2 / X3-g3 |
| LOCAL FIELD { REPLICA GROUP 0 / REPLICA GROUP 1 / REPLICA GROUP 2 / REPLICA GROUP 3 | LF0-g0 / LF0-g1 / LF0-g2 / LF0-g3 | LF1-g0 / LF1-g1 / LF1-g2 / LF1-g3 | LF2-g0 / LF2-g1 / LF2-g2 / LF2-g3 | LF3-g0 / LF3-g1 / LF3-g2 / LF3-g3 |
| WEIGHT COEFFICIENT | W00 / W10 / W20 / W30 | W01 / W11 / W21 / W31 | W02 / W12 / W22 / W32 | W03 / W13 / W23 / W33 |

OPTIMIZATION APPARATUS AND OPTIMIZATION METHOD

CROSS-REFERENCE TO RELATED APPLICATION

This application is based upon and claims the benefit of priority of the prior Japanese Patent Application No. 2020-26340, filed on Feb. 19, 2020, the entire contents of which are incorporated herein by reference.

FIELD

The embodiments discussed herein are related to an optimization apparatus and an optimization method.

BACKGROUND

As apparatuses for calculating large-scale discrete optimization problems which are not easily handled by Neumann type computers, there is an Ising machine (also referred to as a Boltzmann machine) using an Ising type energy function (also referred to as a cost function or an objective function).

In calculation by an Ising machine, a problem to be calculated is replaced with the Ising model that is a model indicating the behavior of a spin of a magnetic body. Based on the Markov chain Monte Carlo method such as a simulated annealing method or a replica exchange method (also referred to as an exchange Monte Carlo method), a state in which the value of the Ising model type energy function (corresponding to the energy of the Ising model) is minimized is searched.

In the calculation by an Ising machine, a weight coefficient that represents the magnitude of interaction between the respective state variables is used. When the number of state variables increases in response to an increase in the problem scale, the number of weight coefficients also increases. In the fully coupled Ising machine which is excellent in flexibility when the problem is replaced with the Ising model and may consider the interaction between all the state variables, the weight coefficient to be stored is proportional to the square of the number of state variables. Therefore, in a case where the Ising machine is implemented by a single apparatus (for example, one chip), there is a possibility that all the weight coefficients may not be stored in the internal memory. There is a method in which the weight coefficients are stored in a large-capacity storage apparatus, the subproblems obtained by dividing the problem are transferred to the Ising calculating unit, and the calculation is performed by appropriately transposing the subproblems to be transferred, but it takes time to transpose the weight coefficients used for the calculation of each subproblem.

In the related art, in order to speed up the processing by the Markov chain Monte Carlo method, there is a method in which the same Ising model is assigned to each of a plurality of Ising chips and the processing is performed in parallel. There is also a method in which the problem is divided into a plurality of subproblems, and the plurality of subproblems are assigned to a plurality of Ising chips, and the calculation for the respective subproblems is executed in parallel.

Related techniques are disclosed in, for example, Japanese Laid-open Patent Publication No. 2018-206127 and Japanese Laid-open Patent Publication No. 2016-51350.

SUMMARY

According to an aspect of the embodiments, an optimization apparatus includes: a plurality of Ising machines that each search for a solution of a subproblem among a plurality of subproblems obtained by dividing a problem represented by an Ising model, each of the plurality of Ising machines including: a memory configured to store values of a state variable set corresponding to a subproblem to be calculated for a plurality of groups; a processor coupled to the memory and the processor configured to: perform processing of calculating a second solution candidate for each of the plurality of groups based on first solution candidates of subproblems calculated by other Ising machines by changing a group to be processed for every unit period such that the second solution candidate is calculated for the state variable set of a group different from groups processed by the other Ising machines in a same unit period; and a communication circuit configured to transmit the second solution candidate to the other Ising machines every time the unit period ends.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a subproblem to be calculated, a local field, and a weight coefficient used for calculation in each Ising machine;

DESCRIPTION OF EMBODIMENTS

The principle of energy minimization of the Ising model by the Markov chain Monte Carlo method is that the values of the state variables are sequentially updated (the value of 1 bit is inverted).

In a case where a method is applied in which the problem is divided into subproblems and the solution searching is performed by a plurality of Ising machines, other Ising machines do not perform the update but are in a pause state when any one of the plurality of Ising machines updates the value of a state variable in order to satisfy this principle.

Therefore, the arithmetic unit in each Ising machine may not be effectively used and the calculation efficiency decreases.

Embodiments of the present disclosure are described below with reference to the drawings.

First Embodiment

Figure 1:
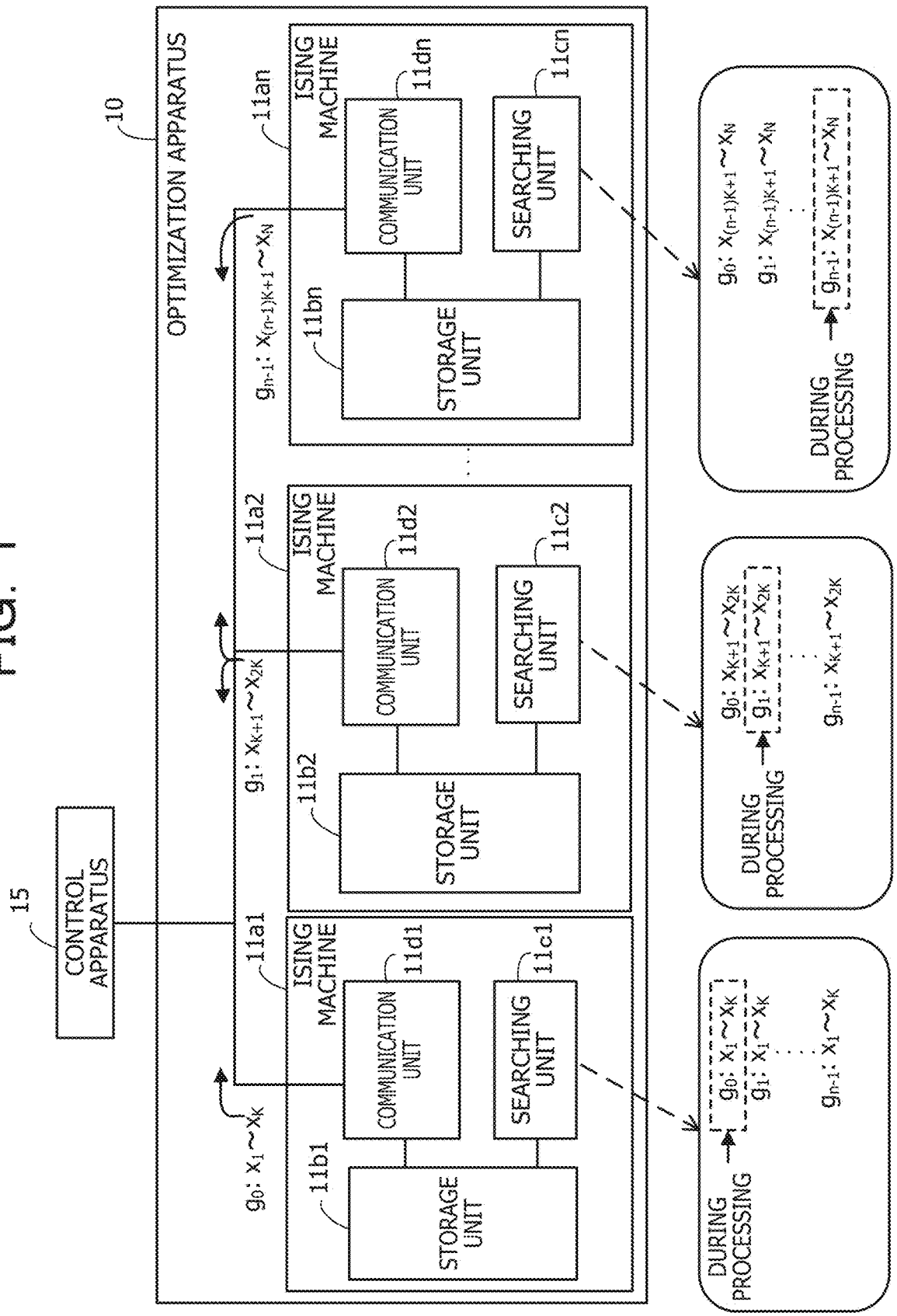
FIG. 1 is a diagram illustrating an example of an optimization apparatus according to a first embodiment.

FIG. 1 is a diagram illustrating an example of an optimization apparatus according to a first embodiment.

An optimization apparatus 10 according to the first embodiment includes a plurality of Ising machines 11a1, 11a2, ..., and 11an.

Each of the Ising machines 11a1 to 11an searches for a solution (a combination of values of state variables that minimizes energy of the Ising model) of any subproblem among a plurality of subproblems obtained by dividing a problem represented by the Ising model. Problems represented by the Ising model include various discrete optimization problems.

The energy of the Ising model of the whole problem is defined by, for example, an energy function E(x) as expressed by the following Equation (1).

$$E(x) = -\sum_{\langle i,j \rangle} W_{ij} x_i x_j - \sum_{i=1}^{N} b_i x_i + c \tag{1}$$

The first term on the right side adds up the products of two state variable values and a weight coefficient without missing and overlapping among all combinations of two state variables selectable from N state variables included in the Ising model. $x_i$ is the ith state variable. $x_j$ is the jth state variable. $W_{ij}$ is a weight coefficient indicating a weight (such as a strength of coupling) between the ith state variable and the jth state variable. $W_{ii}=0$. $W_{ij}=W_{ji}$.

The second term on the right side is a sum, for all state variables, of a product of a bias coefficient of a state variable and a value of the state variable. $b_i$ represents a bias coefficient for the ith state variable. c is a constant.

For example, "−1" of a spin in the Ising model corresponds to a value "0" of the state variable. "+1" of the spin in the Ising model corresponds to a value "1" of the state variable. Therefore, the state variable may be called "bit" having a value of 0 or 1.

The combination of the values of state variables that minimizes the value of Equation (1) is the solution to a problem.

The energy of the Ising model for the subproblem that handles state variables of i=1 to K (K<N), which are some of N (N bits) state variables, is defined by an energy function E'(x) as expressed by the following Equation (2), for example.

$$E'(x) = -\sum_{\langle i,j \rangle}^{K} W_{ij} x_i x_j - \sum_{i=1}^{K} b'_i x_i + c' \tag{2}$$

In Equation (2), $b'_i$ and c' may be expressed as Equations (3) and (4).

$$b'_i = b_i + \sum_{j=K+1}^{N} W_{ij} x_j \tag{3}$$

$$c' = c - \sum_{i=K+1}^{N} b_i x_i - \sum_{i=K+1}^{N} \sum_{j>i}^{N} W_{ij} x_i x_j \tag{4}$$

When a solution to a subproblem that handles state variables i=1 to K (K<N) is searched for, the values of state variables i=K+1 to N are fixed. The second term on the right side of Equation (3) represents a contribution to the bias coefficient by the state variable set to the fixed value, and the third and fourth terms on the right side of Equation (4) represent a contribution to the constant by the state variable set to the fixed value.

A case is described below where N state variables are divided into n by K and n subproblems are thus obtained. In this case, a set of state variables (state variable set) corresponding to the subproblem to be calculated by the Ising machine 11a1 is $x_1$ to $x_K$, and the state variable set corresponding to the subproblem to be calculated by the Ising machine 11a2 is $x_{K+1}$ to $x_{2K}$. The state variable set corresponding to the subproblem to be calculated by the Ising machine 11an is $x_{(n-1)K+1}$ to $x_N$.

Each of the Ising machines 11a1 to 11an includes a storage unit 11b1, 11b2, ..., or 11bn, a searching unit 11c1, 11c2, ..., or 11cn, and a communication unit 11d1, 11d2, ..., or 11dn.

The storage units 11b1 to 11bn store values of the state variable set corresponding to the subproblem to be calculated for a plurality of groups (n groups in the following example). For example, the storage unit 11b1 stores the state variable set ($x_1$ to $x_K$) corresponding to the subproblem under the charge of the Ising machine 11a1 for n groups.

The storage units 11b1 to 11bn further store the weight coefficients used in the processing in the searching units 11c1 to 11cn, and the like. For example, the storage unit 11b1 of the Ising machine 11a1 stores the weight coefficients used for calculating Equations (2) and (3). W included in the first term on the right side of Equation (2) is the weight coefficient between $x_1$ to $x_K$. $W_{ij}$ included in the second term on the right side of Equation (3) is the weight coefficient between each of $x_1$ to $x_K$ and each of $x_{K+1}$ to $x_N$.

$W_{ij}$ included in the third term on the right side of Equation (4) is the weight coefficient between $x_{K+1}$ to $x_N$ and may not be stored in the storage unit 11b1. A control apparatus 15 outside the Ising machines 11a1 to 11an may calculate c' of Equation (4) based on the values of $x_{K+1}$ to $x_N$ that are fixed values, the bias values thereof, the weight coefficient between $x_{K+1}$ to $x_N$, and c. In this case, c' calculated by the control apparatus 15 is transmitted to the Ising machine 11a1, is stored in the storage unit 11b1, and is used for the calculation of E'(x). Therefore, in a case where $W_{ij}=W_{ji}$, the number of weight coefficients stored in the storage unit 11b1 may be K×N among N×N.

The same applies to the other storage units 11b2 to 11bn, and K×N weight coefficients may be stored in each of the other storage units 11b2 to 11bn.

The storage units 11b1 to 11bn are implemented by, for example, electronic circuits such as a static random-access memory (SRAM) and a High Bandwidth Memory (HBM). In the Ising machine 11a1, the weight coefficient between $x_1$ to $x_K$ is frequently used because it is used for the calculation of the energy change when any value of $x_1$ to $x_K$ is updated, and is thus stored in an SRAM, for example.

Each of the searching units 11c1 to 11cn calculates the solution candidate of the subproblem for the state variable set of each of n groups to which the group numbers ($g_0$, $g_1, \ldots,$ and $g_{n-1}$) are assigned based on the solution candidate of the subproblem calculated by other Ising machines. For example, the searching unit 11c1 of the Ising machine 11a1 calculates a solution candidate for a state variable set ($x_1$ to $x_K$) for n groups (hereinafter, referred to as groups $g_0, g_1, \ldots,$ and $g_{n-1}$).

The solution candidate is calculated by using the Markov chain Monte Carlo method such as a simulated annealing method or a replica exchange method. For example, the searching unit 11c1 calculates a change in E'(x) (energy change) due to a change (update) of one of $x_1$ to $x_K$ for each of $x_1$ to $x_K$, and stochastically accepts the change in a form in which a change in which E'(x) decreases is preferred. Among $x_1$ to $x_K$, an energy change ($\Delta E'_i$) due to a change in $x_i$ may be expressed as the following Equation (5).

$$\Delta E'_i = -\Delta x_i \left( \sum_j^K W_{ij} x_j + b'_i \right) = -\Delta x_i h_i \quad (5)$$

In Equation (5), $\Delta x_i$ is equal to $-1$ when $x_i$ changes from 1 to 0 and $\Delta x_i$ is equal to 1 when the state variable $x_i$ changes from 0 to 1. $h_i$ is called a local field, and the product of $h_i$ by a sign ($+1$ or $-1$) in accordance with $\Delta x_i$ is $\Delta E'_i$.

A change in $h_i$ that accompanies a change in the value of $x_j$ may be expressed as $+W_{ij}$ in a case where $\Delta x_j$ is 1 and $-W_{ij}$ in a case where $\Delta x_j$ is $-1$. For example, $h_i$ may be updated by adding or subtracting $W_{ij}$ to or from the original $h_i$ in accordance with $\Delta x_j$.

However, the searching unit 11c1 fixes the values (values of $x_{K+1}$ to $x_N$) of the solution candidates of the subproblems calculated by the other Ising machines. The searching unit 11c1 also stochastically allows a change in which E'(x) increases. The searching unit 11c1 repeats such processing until a search end condition (for example, whether or not a predetermined number of repetitions ends) is satisfied and sets the values of $x_1$ to $x_K$ when the search end condition is satisfied as the solution candidates in a unit period.

The searching unit 11c1 calculates E'(x) when the solution candidate for the subproblem for each group is obtained according to Equation (2).

In a case where each of the plurality of Ising machines 11a1 to 11an includes a plurality of replicas, each of the plurality of replicas calculates the solution candidate for each of n groups and calculates E'(x) in the searching unit 11c1.

Each of the searching units 11c2 to 11cn also performs operations similar to those described above.

However, each of the searching units 11c1 to 11cn performs the processing of calculating the solution candidates by changing the group processed for every unit period. In the same unit period, each of the searching units 11c to 11cn calculates the solution candidates for the state variable set of a group different from the groups processed by the other Ising machines. For example, in the same unit period, each of the searching units 11c1 to 11cn calculates the solution candidates for the state variable set of a group to which a group number different from group numbers of other groups processed by the other Ising machines is assigned. For example, in a unit period in which the searching unit 11c1 calculates the solution candidates for $x_1$ to $x_K$ of the group $g_0$, the searching units 11c2 to 11cn calculate the solution candidates for the state variable set of groups different from the group $g_0$.

The searching units 11c1 to 11cn may be implemented by, for example, an electronic circuit such as an application-specific integrated circuit (ASIC) or a field-programmable gate array (FPGA). The configuration is not limited to this, and part or all of the searching units 11c1 to 11cn may be implemented by software processing resulting from execution of a program by a processor such as a central processing unit (CPU) or a graphics processing unit (GPU).

Every time the unit period ends, the communication units 11d1 to 11dn transmit the calculated solution candidates to the other Ising machines. For example, the communication unit 11d1 transmits the solution candidates calculated for $x_1$ to $x_K$ of the group $g_0$ to the Ising machines 11a2 to 11an.

The communication units 11d1 to 11dn are implemented by various electronic circuits. For example, an electronic circuit that performs communication in conformity with an interface standard such as Peripheral Component Interconnect (PCI) Express is used as the communication units 11d1 to 11dn.

The control apparatus 15 controls the optimization apparatus 10. For example, the control apparatus 15 divides a problem into subproblems, sets the subproblems to each of the Ising machines 11a1 to 11an, sets the operation, sets the group to be processed in each unit period, instructs to transfer the calculated solution candidates, and the like. The control apparatus 15 may receive the values of the state variable set transmitted by the Ising machines 11a1 to 11an and calculate c' by Equation (4). The control apparatus 15 may receive the energy of the Ising model that corresponds to the solution candidate of each subproblem transmitted by the Ising machines 11a1 to 11an and calculate the energy E(x) of Equation (1) by the sum of the received energy.

The control apparatus 15 may be a processor such as a CPU or a GPU or a computer such as a personal computer (PC). The control apparatus 15 performs the processing as described above by executing a control program of the optimization apparatus 10 stored in a memory (not illustrated).

Operations by the optimization apparatus 10 according to the first embodiment and an example of control of the optimization apparatus 10 by the control apparatus 15 are described below.

Figure 2:
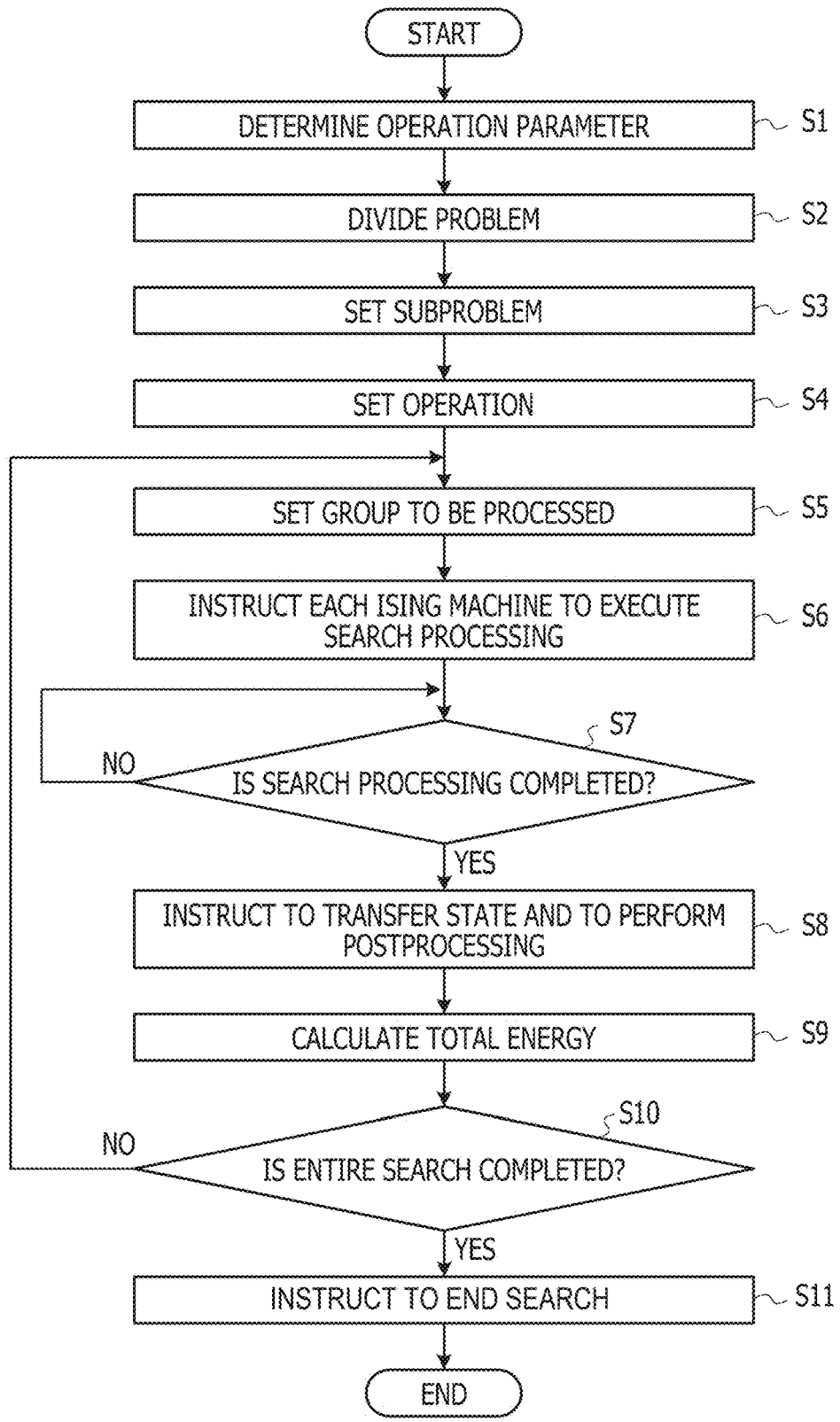
FIG. 2 is a flowchart illustrating a flow of an example of control of an optimization apparatus by a control apparatus.

FIG. 2 is a flowchart illustrating a flow of an example of control of an optimization apparatus by a control apparatus.

The control apparatus 15 determines the operation parameters such as the size of the subproblem according to the scale of the problem to be calculated, the number of Ising machines 11a1 to 11an, and the like (step S1). In a case where an N-bit problem is divided into n subproblems, the control apparatus 15 sets the size of subproblem to N/n bits.

In a case where the replica exchange method is used when the solution candidate is calculated in each of the Ising machines 11a1 to 11an, the control apparatus 15 determines the number of replicas per group=R/n as one of the operation parameters when the number of replicas is R. Other examples of the operation parameters include the maximum value and minimum value of a temperature parameter used in the simulated annealing method and the replica exchange method, the change schedule of a temperature parameter, and the like.

The control apparatus 15 divides the problem based on the determined operation parameters (step S2) and sets a subproblem in each of the Ising machines 11a1 to 11an (step S3). The subproblem is set by, for example, transmitting an index of each state variable of the state variable set corresponding to each subproblem and the weight coefficient and bias coefficient used for the calculation of each subproblem to the Ising machines 11a1 to 11an. The control apparatus 15 may transmit the initial values of $x_1$ to $x_N$ to the Ising machines 11a1 to 11an. For example, an index (i)=1 to K, the initial values of $x_1$ to $x_N$, the weight coefficient between $x_1$ to $x_K$, and the weight coefficient between each of $x_1$ to $x_K$ and each of $x_{K+1}$ to $x_N$, and $b_1$ to $b_k$ are transmitted to the Ising machine 11a1.

The control apparatus 15 sets operations for the Ising machines 11a1 to 11an (step S4). In the processing of step S4, the number of repetitions of the solution candidate calculation processing (hereinafter, referred to as search processing in some cases) executed by the searching units 11c1 to 11cn in the unit period and various operation parameters are designated for the Ising machines 11a1 to 11an.

The control apparatus 15 sets a group to be processed (step S5). For example, the control apparatus 15 sets the group to be processed in each of the Ising machines 11a1 to 11an so that the processing order of the state variable set in the same group is $x_1$ to $x_K$, $x_{K+1}$ to $x_{2K}$, . . . , and $x_{(n-1)K+1}$ to $x_N$. The control apparatus 15 may change the processing order of the state variable set corresponding to each subproblem in the same group at predetermined processing timing. For example, the control apparatus 15 may randomly determine the processing order by using a random number value.

However, the control apparatus 15 changes the group processed by the same Ising machine for every unit period of the search processing and sets the processing order so that different groups are processed among the Ising machines 11a1 to 11an in the same unit period.

The control apparatus 15 instructs each of the Ising machines 11a1 to 11an to execute search processing (step S6). The control apparatus 15 stands by until the search processing is completed in a case where the search processing in the unit period is not completed by all of the Ising machines 11a1 to 11an (step S7: NO), and the control apparatus 15 proceeds to the processing of step S8 in a case where the search processing is completed (step S7: YES).

In the processing of step S8, the control apparatus 15 instructs the Ising machines 11a1 to 11an to transfer the state to be a solution candidate and to perform postprocessing. The postprocessing includes, for example, calculation of E'(x) of Equation (2) and calculation of Equation (3) for search processing in the next unit period.

The control apparatus 15 receives E'(x) and solution candidate of each group calculated by each of the Ising machines 11a1 to 11an and calculates the total energy (E(x) of Equation (1)) for every group by the sum of E'(x) for every group (step S9).

In a case where a predetermined search end condition (for example, whether a predetermined number of repetitions has ended, whether the target energy has reached, or the like) is satisfied, the control apparatus 15 determines that the entire search is completed (step S10: YES) and instructs the optimization apparatus 10 to end the search (step S11). The control apparatus 15 ends the control of the optimization apparatus 10. In a case where the predetermined search end condition is not satisfied, the control apparatus 15 determines that the entire search is not completed (step S10: NO) and repeats the processing from step S5.

For example, the control apparatus 15 outputs the values of $x_1$ to $x_N$ when the minimum energy is obtained in all the groups as a solution to the problem until it is determined that the entire search is completed. The control apparatus 15 outputs the obtained solution to, for example, a display apparatus (not illustrated) for display. Alternatively, the control apparatus 15 may output the obtained solution to a memory (not illustrated) for storage or transmit the obtained solution to another information processing apparatus via a network.

A flow of an example of operations by the optimization apparatus 10 (optimization method by the optimization apparatus 10) is described below.

Figure 3:
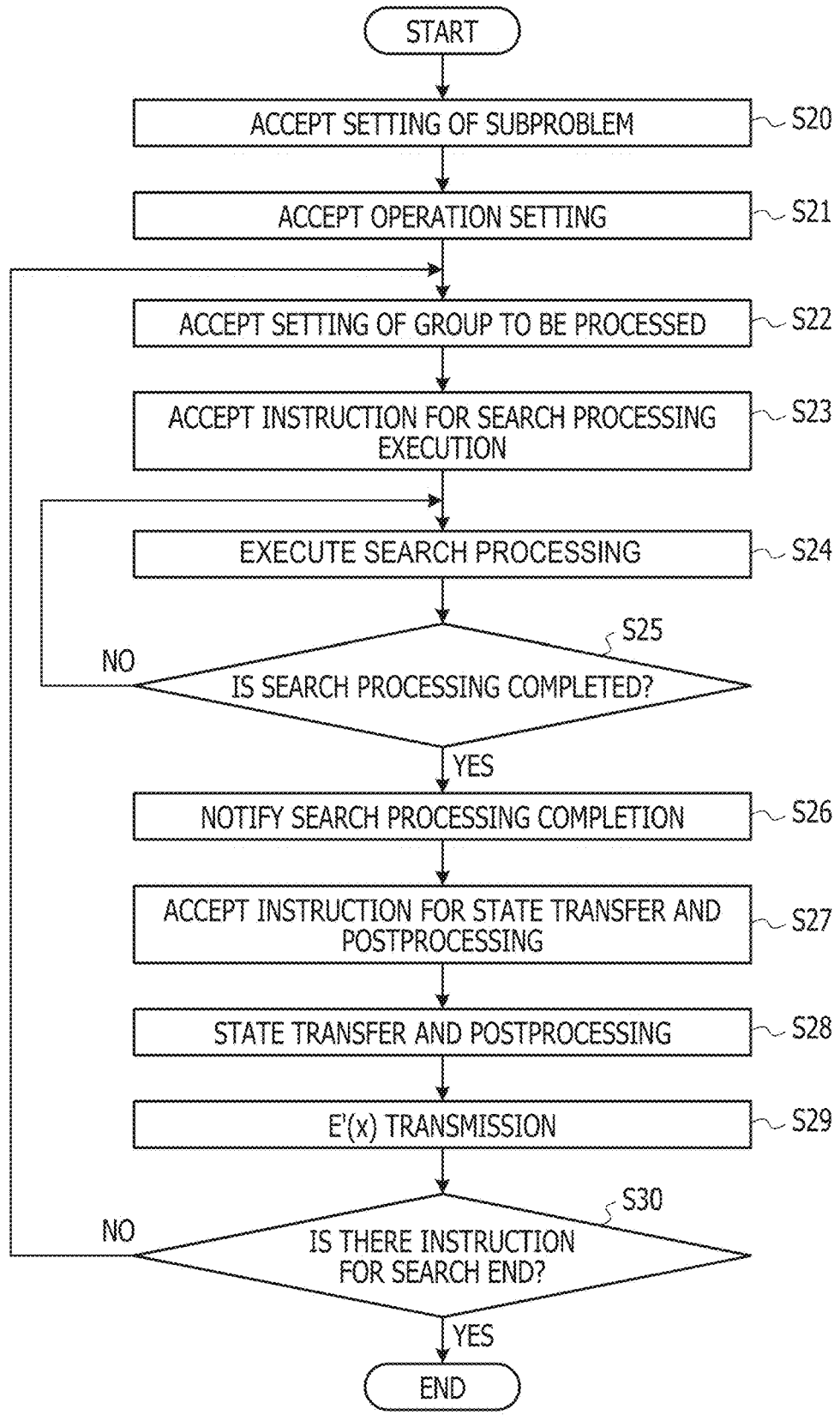
FIG. 3 is a flowchart illustrating a flow of an example of operations by an optimization apparatus.

FIG. 3 is a flowchart illustrating a flow of an example of operations by an optimization apparatus.

The Ising machines 11a1 to 11an of the optimization apparatus 10 accept the setting of the subproblem by the control apparatus 15 (step S20). In the processing of step S20, the communication units 11d1 to 11dn of the Ising machines 11a1 to 11an receive, for example, the index of each state variable of the state variable set corresponding to each subproblem and the weight coefficient and bias coefficient used for the calculation of each subproblem from the control apparatus 15. The storage units 11b1 to 11bn store the indexes received by the communication units 11d1 to 11dn, the initial values of $x_1$ to $x_N$, the weight coefficients, and the bias coefficients. For example, the storage unit 11b1 of the Ising machine 11a1 stores the index (i)=1 to K, the initial values of $x_1$ to $x_N$, the weight coefficient between $x_1$ to $x_K$, and the weight coefficient between each of $x_1$ to $x_K$ and each of $x_{K+1}$ to $x_N$, and the bias coefficients $b_1$ to $b_K$.

The Ising machines 11a1 to 11an accept the operation setting by the control apparatus 15 (step S21). In the processing of step S21, the communication units 11d1 to 11dn of the Ising machines 11a1 to 11an receive the number of repetitions of the search processing by the searching units 11c1 to 11cn in the unit period and various operation parameters. The storage units 11b1 to 11bn store the number of repetitions and various operation parameters received by the communication units 11d1 to 11dn.

The Ising machines 11a1 to 11an accept the setting of the group to be processed by the control apparatus 15 (step S22). In the processing of step S22, the communication units 11d1 to 11dn receive information indicating the group to be processed, and the storage units 11b1 to 11bn store the received information.

When the Ising machines 11a1 to 11an receive an instruction to execute the search processing from the control apparatus 15 (step S23), the Ising machines 11a1 to 11an execute the search processing based on the operation parameters, the information indicating the group to be processed, and the like stored in the storage units 11b1 to 11bn (step S24).

In the search processing in the first unit period, the searching units 11c1 to 11cn calculate the energy change used for the search processing by using the initial value of the state variable set calculated by the other Ising machines as a fixed value. For example, the searching unit 11c1 calculates the local field ($h_i$) in order to calculate $\Delta E'$ of Equation (5). $b'_i$ for calculating $h_i$ may be calculated by Equation (3). $x_j$ in Equation (3) is the fixed value described above.

By setting the processing order by the control apparatus 15, the search processing is performed by changing the group of the state variable set processed for every unit period. In the same unit period, the search processing is performed for the state variable set of a group different from the groups processed by the other Ising machines.

In the example of FIG. 1, in the unit period in which the searching unit 11c1 of the Ising machine 11a1 performs search processing for $x_1$ to $x_K$ of the group $g_0$, the searching unit 11c2 of the Ising machine 11a2 performs search processing for $x_{K+1}$ to $x_{2K}$ of the group $g_1$. In this unit period, the searching unit 11cn performs search processing for $x_{(n-1)K+1}$ to $x_N$ of the group $g_{n-1}$.

The searching units 11c1 to 11cn determine whether or not the search processing in the unit period is completed based on, for example, whether or not the search processing is performed by the number of repetitions stored in the storage units 11b1 to 11bn (step S25). In a case where it is determined that the search processing in the unit period is not completed, the processing of step S24 is repeated. In a case where it is determined that the search processing in the unit period is completed, the processing of step S26 is performed.

In the processing of step S26, the communication units 11d1 to 11dn notify the control apparatus 15 that the search processing in the unit period has been completed (step S26).

When each of the Ising machines 11a1 to 11an accepts an instruction for state transfer and postprocessing from the control apparatus 15 (step S27), each of the Ising machines 11a1 to 11an transfers the state to be a solution candidate to the other Ising machines and performs the postprocessing (step S28). The state to be a solution candidate may also be transferred to the control apparatus 15.

For example, as illustrated in FIG. 1, the communication unit 11d1 of the Ising machine 11a1 transfers $x_1$ to $x_K$ of the group $g_0$, that are the state which is to be a solution candidate and obtained in the search processing in this unit period, to the Ising machines 11a2 to 11an. The communication unit 11d2 of the Ising machine 11a2 transfers $x_{K+1}$ to $x_{2K}$ of the group $g_1$, that are the state which is to be a solution candidate and obtained in the search processing in this unit period, to Ising machines other than the Ising machine 11a2. The communication unit 11dn of the Ising machine 11an transfers $x_{(n-1)K+1}$ to $x_N$ of the group $g_{n-1}$, that are the state which is to be a solution candidate and obtained in the search processing in this unit period, to the Ising machines other than the Ising machine 11an. The storage units 11b1 to 11bn of the Ising machines 11a1 to 11an which have received the transferred states store the received states.

As postprocessing, the searching units 11c1 to 11cn calculate the local fields for the next search processing for each group based on the states stored in the storage units 11b1 to 11bn, the values of the state variable set corresponding to the subproblems for which the searching units themselves are in charge of the calculation, the weight coefficients, and the like. The calculation of local fields is performed for each group.

For example, the searching unit 11c1 calculates $h_i$ used for calculating $\Delta E'_i$ of Equation (5). $b'_i$ for calculating $h_i$ may be calculated by Equation (3). As $x_j$ in Equation (3), $x_{K+1}$ to $x_N$ (states transferred from the Ising machines 11a2 to 11an) are used as fixed values.

The searching units 11c2 to 11cn also calculate the local fields using similar equations. For example, when the searching unit 11c2 calculates the local field, in Equations (3) and (5), i may be set to K+1 to 2K and the second term on the right side of Equation (3) may be set to a value obtained by adding the sum of $W_{ij}x_j$ for j=1 to K and the sum of $W_{ij}x_j$ for j=2K+1 to N. In Equation (5), 2K may be used instead of K and j may be set to K+1 to 2K.

In the postprocessing, the searching units 11c1 to 11cn calculate E'(x) for each group. The searching unit 11c1 calculates E'(x) according to Equation (2). In the calculation of E'(x), c' calculated by the control apparatus 15 based on Equation (4) is used. The searching units 11c2 to 11cn also calculate E'(x) using similar equations. For example, when the searching unit 11c2 calculates E'(x), the second term on the right side of Equation (2) may be the sum of $W_{ij}x_ix_j$ in the ranges of i, j=K+1 to 2K.

The communication units 11d1 to 11dn of the Ising machines 11a1 to 11an transmit E'(x) for each subproblem to the control apparatus 15 (Step S29). In a case where the communication units 11d1 to 11dn of the Ising machines 11a1 to 11an receive an instruction to end the search from the control apparatus 15 (in a case where an instruction to end the search is received) (step S30: YES), the searching units 11c1 to 11cn end the search processing. In a case where an instruction to end the search is not received from the control apparatus 15 (step S30: NO), the processing from step S22 is repeated.

The processing order in FIGS. 2 and 3 is an example, and the processing order may be transposed as appropriate.

According to the optimization apparatus 10 of the first embodiment as described above, each of the Ising machines 11a1 to 11an uses a state variable set corresponding to a subproblem for which the Ising machine itself is in charge of calculation, for n groups. Each of the Ising machines 11a1 to 11an performs search processing by changing the group processed for every unit period and performs search processing for the state variable set of a group different from the groups processed by the other Ising machines in the same unit period. Accordingly, since the update of the value of the state variable is sequentially performed in each group, the principle of energy minimization of the Ising model by the Markov chain Monte Carlo method is satisfied. While a certain Ising machine performs search processing for a state variable set of a certain group, another Ising machine may perform search processing for a state variable set of another group, and thus each Ising machine may efficiently operate and the calculation efficiency may be improved. Accordingly, the solution searching performance of the optimization apparatus 10 for a large-scale problem is improved.

Second Embodiment

Figure 4:
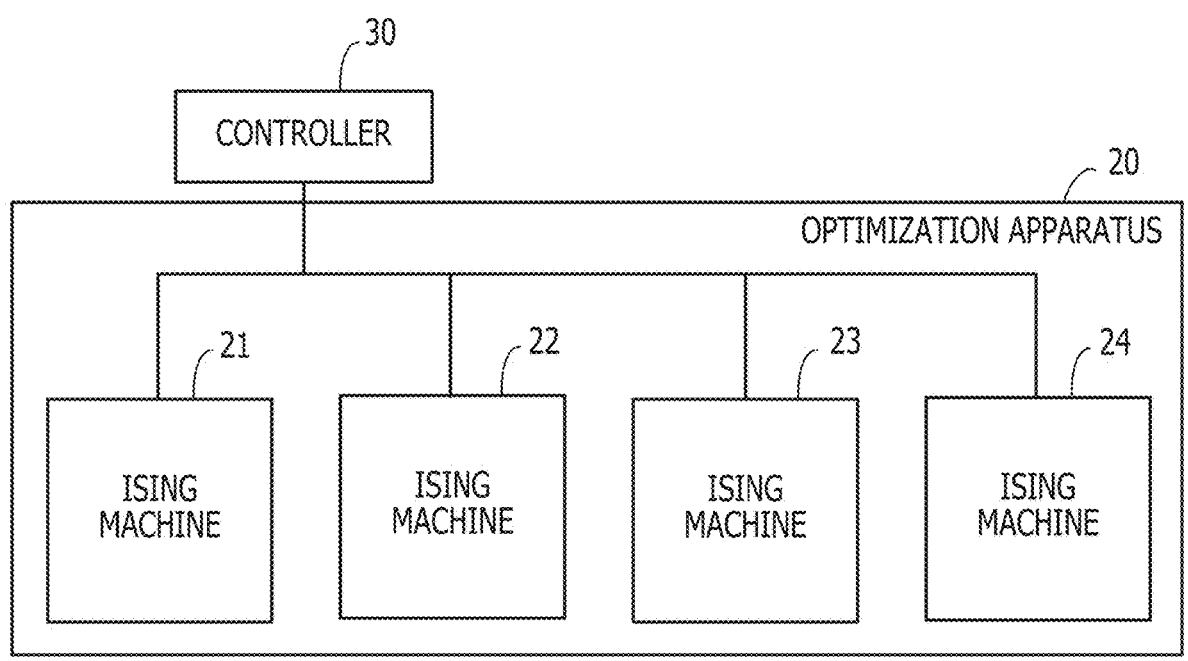
FIG. 4 is a diagram illustrating an example of an optimization apparatus according to a second embodiment.

FIG. 4 is a diagram illustrating an example of an optimization apparatus according to a second embodiment.

An optimization apparatus 20 according to the second embodiment includes four Ising machines 21, 22, 23, and 24. For example, the optimization apparatus 20 according to the second embodiment is an example in which n=4 in the optimization apparatus 10 according to the first embodiment. The optimization apparatus 20 is controlled by a controller 30. The controller 30 is an example of the control apparatus 15 described above and has similar functions to those of the control apparatus 15.

Each of the Ising machines 21 to 24 has similar functions to those of each of the Ising machines 11a1 to 11an of the optimization apparatus 10 according to the first embodiment.

In the following example, it is assumed that a problem represented by an N-bit Ising model by $x_1$ to $x_N$ is divided into four subproblems, and K (=N/4) bits are assigned to each of the Ising machines 21 to 24.

FIG. 5 is a diagram illustrating an example of a subproblem to be calculated, a local field, and a weight coefficient used for calculation in each Ising machine.

X0 indicating $x_1$ to $x_K$ among $x_1$ to $x_N$ is a state corresponding to a subproblem calculated by the Ising machine 21. X1 indicating $x_{K+1}$ to $x_{2K}$ among $x_1$ to $x_N$ is a state corresponding to a subproblem calculated by the Ising machine 22. X2 indicating $x_{2K+1}$ to $x_3K$ among $x_1$ to $x_N$ is a state corresponding to a subproblem calculated by the Ising machine 23. X3 indicating $x_{3K+1}$ to $x_N$ among $x_1$ to $x_N$ is a state corresponding to a subproblem calculated by the Ising machine 24.

In the Ising machines 21 to 24, the states are each used for four groups. Hereinafter, the four groups are referred to as replica groups 0, 1, 2, and 3. Hereinafter, X0 in each of the replica groups 0 to 3 is denoted as X0-g0, X0-g1, X0-g2, or X0-g3. X1, X2, and X3 in each of the replica groups 0 to 3 are also denoted in the same manner.

The local fields calculated in the Ising machines 21 to 24 are also calculated for each of the four groups. Hereinafter, the local field calculated by the Ising machine 21 for each of the replica groups 0 to 3 is denoted as LF0-g0, LF0-g1, LF0-g2, or LF0-g3. The local fields calculated by the Ising machines 22 to 24 for each of the replica groups 0 to 3 are also denoted in the same manner.

FIG. 5 illustrates an example in which a weight coefficient matrix with N×N weight coefficients is divided into 4×4 weight coefficient groups (W00 to W33).

The weight coefficient groups used by the Ising machine 21 are W00, W10, W20, and W30. W00 is composed of weight coefficients between $x_1$ to $x_K$. W10 is composed of weight coefficients between each of $x_1$ to $x_K$ and $x_{K+1}$ to $x_{2K}$, W20 is composed of weight coefficients between each of $x_1$ to $x_K$ and $x_{2K+1}$ to $x_{3K}$; and W30 is composed of weight coefficients between each of $x_1$ to $x_K$ and $x_{3K+1}$ to $x_N$.

The weight coefficient groups used by the Ising machine 22 are W01, W11, W21, and W31. W11 is composed of weight coefficients between $x_{K+1}$ to $x_{2K}$. W01 is composed of weight coefficients between each of $x_{K+1}$ to $x_2K$ and $x_1$ to $x_K$, W21 is composed of weight coefficients between each of $x_{K+1}$ to $x_2K$ and $x_{2K+1}$ to $x_{3K}$, and W31 is composed of weight coefficients between each of $x_{K+1}$ to $x_{2K}$ and $x_{3K+1}$ to $x_N$.

The weight coefficient groups used by the Ising machine 23 are W02, W12, W22, and W32. W22 is composed of weight coefficients between $x_{2K+1}$ to $x_{3K}$. W02 is composed of weight coefficients between each of $x_{2K+1}$ to $x_{3K}$ and $x_1$ to $x_K$, W12 is composed of weight coefficients between each of $x_{2K+1}$ to $x_{3K}$ and $x_{K+1}$ to $x_2K$, and W32 is composed of weight coefficients between each of $x_{2K+1}$ to $x_{3K}$ and $x_{3K+1}$ to $x_N$.

The weight coefficient groups used by the Ising machine 24 are W03, W13, W23, and W33. W33 is composed of weight coefficients between $x_{3K+1}$ to $x_n$. W03 is composed of weight coefficients between each of $x_{3K+1}$ to $x_N$ and $x_1$ to $x_K$, W13 is composed of weight coefficients between each of $x_{3K+1}$ to $x_N$ and $x_{K+1}$ to $x_2K$, and W23 is composed of weight coefficients between each of $x_{3K+1}$ to $x_N$ and $x_{2K+1}$ to $x_{3K}$.

Figure 6:
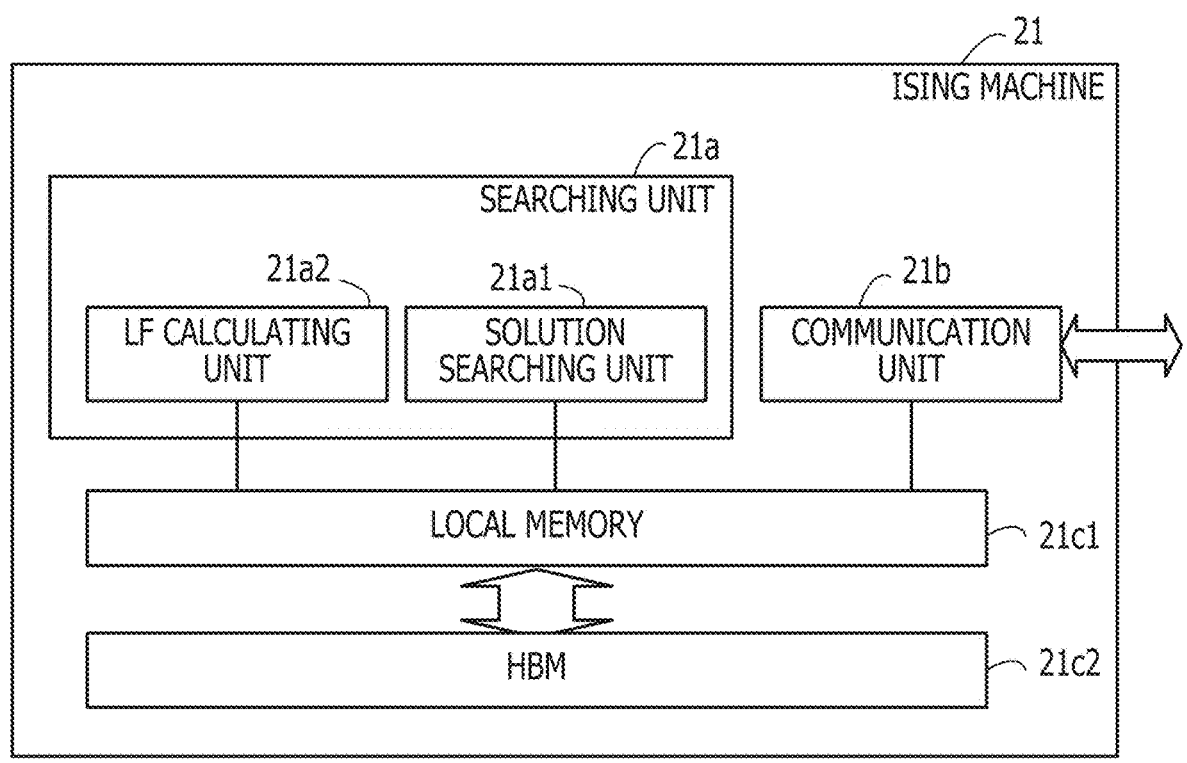
FIG. 6 is a diagram illustrating an example of an Ising machine.

FIG. 6 is a diagram illustrating an example of an Ising machine. FIG. 6 illustrates an example of the Ising machine 21. The Ising machines 22 to 24 are also implemented by similar configurations to that of the Ising machine 21.

The Ising machine 21 includes a searching unit 21a, a communication unit 21b, a local memory 21c1, and an HBM 21c2. For example, the searching unit 21a, the communication unit 21b, and the local memory 21c1 are implemented by a semiconductor integrated circuit of one chip.

The searching unit 21a is an example of the searching unit 11c1 of the optimization apparatus 10 according to the first embodiment and includes a solution searching unit 21a1 and an LF calculating unit 21a2.

The solution searching unit 21a1 searches for X0-g0 to X0-g3 that minimize E'(x) as illustrated in Equation (2) based on the states calculated by the Ising machines 22 to 24 which are the other Ising machines.

The search processing is performed by the Markov chain Monte Carlo method such as a simulated annealing method or a replica exchange method. For example, the solution searching unit 21a1 calculates $\Delta E'_i$ due to a change in one of $x_1$ to $x_K$ by Equation (5) for each of $x_1$ to $x_K$, preferentially accepts a change in which E'(x) decreases, and updates the state. The solution searching unit 21a1 stochastically allows a change in which E'(x) increases as well, $h_i$ in Equation (5) used for calculating $\Delta E$) is updated as the state is updated.

The change in $h_i$ in a case where $x_j$ is updated may be represented as $+W_{ij}$ when $\Delta x_j$ is 1 and as $-W_{ij}$ when $\Delta x_j$ is $-1$. Therefore, the solution searching unit 21a1 holds $h_i$ in a register (not illustrated) and may update $h_i$ depending on whether $W_{ij}$ is added to or subtracted from $h_i$ in accordance with $\Delta x_j$.

The solution searching unit 21a1 repeats such processing for each of the replica groups 0 to 3 until a search end condition (for example, whether a predetermined number of repetitions ends) in the unit period is satisfied. The solution searching unit 21a1 performs search processing by changing the replica group processed for every unit period based on the control by the controller 30. In the same unit period, the solution searching unit 21a1 executes search processing for the state of a replica group different from the replica groups processed by the other Ising machines.

The LF calculating unit 21a2 calculates the local field by fixing the states calculated by the Ising machines 22 to 24.

Figure 7:
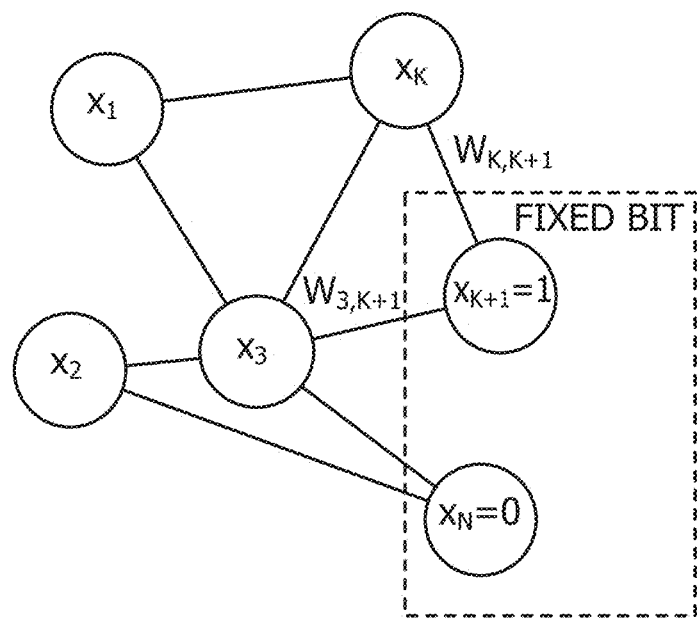
FIG. 7 is a diagram illustrating an example of state fixing.

FIG. 7 is a diagram illustrating an example of state fixing.

FIG. 7 illustrates an example in which $x_{K+1}$ included in the state calculated by the Ising machine 22 and $x_N$ included in the state calculated by the Ising machine 24 are fixed bits ($x_{K+1}$=1 and $x_N$=0 in the example of FIG. 7).

The LF calculating unit 21a2 may determine $b'_i$ used for calculating $h_i$ (i=1 to K) by Equation (3) using the value of the fixed bit and the weight coefficient between the state variable included in the state calculated by the solution searching unit 21a1 and the fixed bit. For example, a weight coefficient ($W_{K, K+1}$) between $x_K$ and $x_{K+1}$ in FIG. 7 is used to calculate $b'_K$ and a weight coefficient ($W_{3, K+1}$) between $x_3$ and $x_{K+1}$ is used to calculate $b'_3$.

The searching unit 21a may be implemented by, for example, an application-specific electronic circuit such as an ASIC or an FPGA. The configuration is not limited to this, and part or all of the searching unit 21a may be implemented by software processing resulting from execution of a program by a processor such as a CPU or a GPU.

The communication unit 21b has similar functions to those of the communication unit 11d1 of the optimization apparatus 10 according to the first embodiment and transmits the state obtained by search processing to the Ising machines 22 to 24 every time the search processing in the unit period ends. The communication unit 21b is, for example, a transceiver circuit which performs communication in conformity with an interface standard such as PCI Express.

The local memory 21c1 stores data used for search processing of the replica group currently being processed by the searching unit 21a. The local memory 21c1 stores, for example, W00 in FIG. 5, a local field (any of LF0-g0 to LF0-g3 in FIG. 5) and a state (any of X0-g0 to X0-g3 in FIG. 5) used for search processing of the replica group currently being processed by the solution searching unit 21a1, and the like. The local memory 21c1 also stores W10, W20, and W30 in FIG. 5 when the LF calculating unit 21a2 calculates $b'_i$ of Equation (3). As the local memory 21c1, for example, an SRAM is used.

The HBM 21c2 stores the entire data used for calculation of the subproblem to be calculated by the Ising machine 21. The HBM 21c2 stores, for example, X0-g0 to X0-g3, LF0-g0 to LF0-g3, W00, W10, W20, and W30 in FIG. 5. In accordance with the processing performed by the solution searching unit 21a1 and the LF calculating unit 21a2, data used for this processing is read from the HBM 21c2 to the local memory 21c1.

Figure 8:
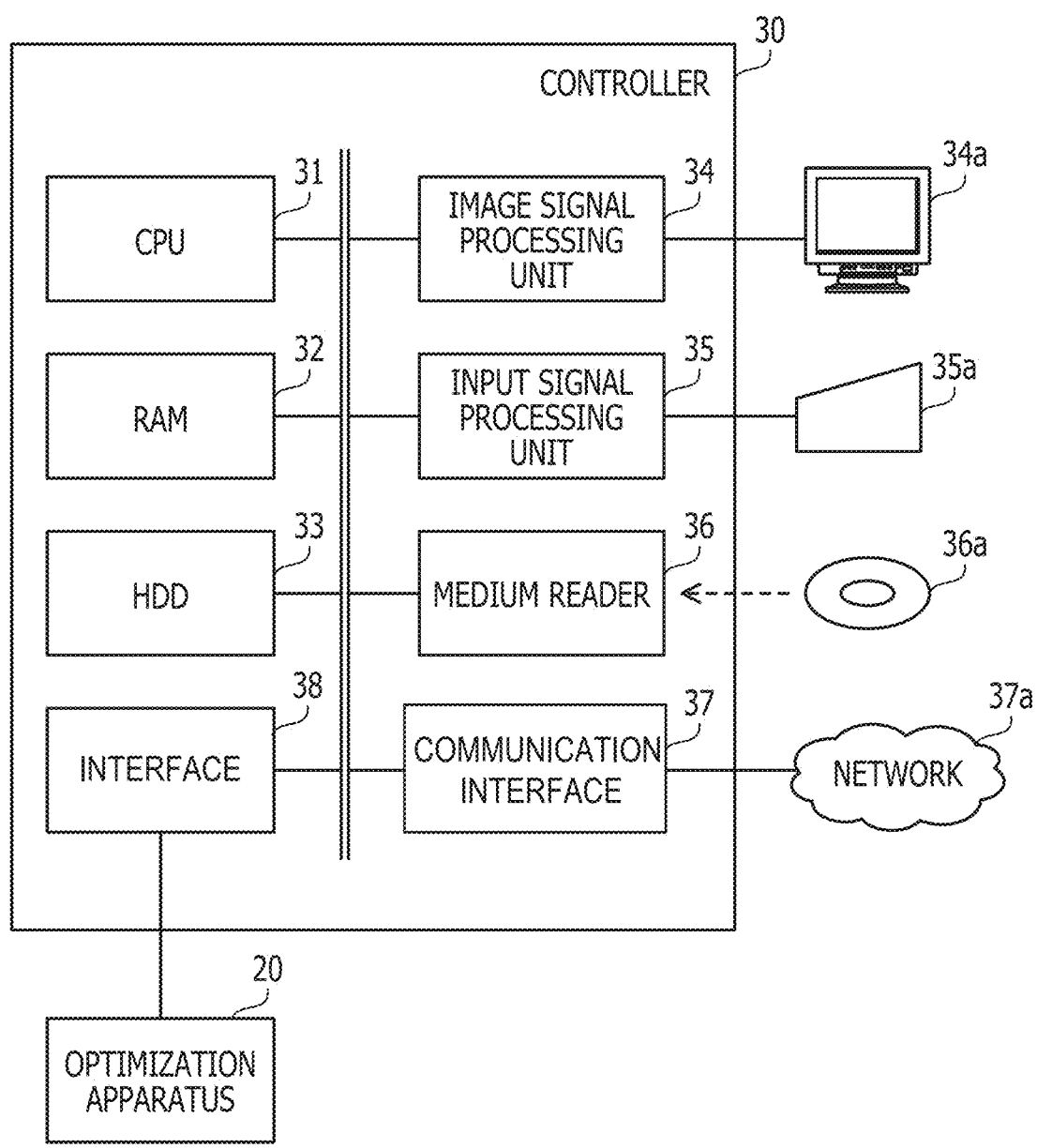
FIG. 8 is a block diagram illustrating a hardware example of a controller.

FIG. 8 is a block diagram illustrating a hardware example of a controller.

The controller 30 is, for example, a computer and includes a CPU 31, a random-access memory (RAH) 32, a hard disk drive (HDD) 33, an image signal processing unit 34, an input signal processing unit 35, a medium reader 36, a communication interface 37, and an interface 38. The above-described units are coupled to a bus.

The CPU 31 is a processor including an arithmetic circuit that executes program instructions. The CPU 31 loads at least part of a program and data stored in the HDD 33 into the RAH 32 and executes the program. The CPU 31 may include a plurality of processor cores, the controller 30 may include a plurality of processors, and the processing to be described below may be executed in parallel using a plurality of processors or processor cores. A set of the plurality of processors (multiprocessor) may be referred to as a "processor".

The RAH 32 is a volatile semiconductor memory that temporarily stores a program executed by the CPU 31 and data used for computation by the CPU 31. The controller 30 may include a type of memory other than the RAH or a plurality of memories.

The HDD 33 is a non-volatile storage apparatus that stores the programs of an operating system (OS) and software such as middleware and application software and data. The programs include, for example, a control program that causes the controller 30 to execute control of the optimization apparatus 20. The controller 30 may include other types of storage apparatuses such as a flash memory and a solid-state drive (SSD) or a plurality of non-volatile storage apparatuses.

The image signal processing unit 34 outputs an image to a display 34a coupled to the controller 30 in accordance with an instruction from the CPU 31. As the display 34a, a cathode ray tube (CRT) display, a liquid crystal display (LCD), a plasma display panel (PDF), an organic electroluminescence (OEL) display, and the like may be used.

The input signal processing unit 35 acquires an input signal from an input device 35a coupled to the controller 30 and outputs the input signal to the CPU 31. As the input device 35a, a pointing device such as a mouse, a touch panel, a touch pad, or a trackball, a keyboard, a remote controller, a button switch, and the like may be used. A plurality of types of input devices may be coupled to the controller 30.

The medium reader 36 is a reading apparatus that reads a program and data recorded in a recording medium 36a. As the recording medium 36a, for example, a magnetic disk, an optical disk, a magneto-optical disk (MO), a semiconductor memory, and the like may be used. The magnetic disk includes a flexible disk (FD) and an HDD. The optical disk includes a compact disc (CD) and a digital versatile disc (DVD).

For example, the medium reader 36 copies a program and data read from the recording medium 36a to another recording medium such as the RAM 32 or the HDD 33. The read program is executed by the CPU 31, for example. The recording medium 36a may be a portable recording medium or may be used to distribute the program and data. The recording medium 36a and the HDD 33 may be referred to as computer-readable recording media.

The communication interface 37 is an interface that is coupled to a network 37a and communicates with another information processing apparatus via the network 37a. The communication interface 37 may be a wired communication interface coupled to a communication apparatus such as a switch via a cable or a wireless communication interface coupled to a base station via a wireless link.

The interface 38 is coupled to the optimization apparatus 20 and exchanges data between the CPU 31 and the optimization apparatus 20. The interface 38 may be, for example, a wired communication interface such as PCI Express or a wireless communication interface.

The control apparatus 15 illustrated in FIG. 1 may also be implemented by using, for example, hardware as described above.

Operations by the optimization apparatus 20 according to the second embodiment and a control example of the optimization apparatus 20 by the controller 30 are described below.

The flow of an example of the control of the optimization apparatus 10 by the control apparatus 15 illustrated in FIG. 2 may also be applied to the control of the optimization apparatus 20 by the controller 30. A flow of an example of the control of the optimization apparatus 20 by the controller 30 is briefly described below with reference to FIG. 2.

In the operation parameter determination processing of step S1, the controller 30 sets the size of the subproblem for the N-bit problem to N/4 bits. In a case where the replica exchange method is used in the search processing in each of the Ising machines 21 to 24, the controller 30 determines the number of replicas per group=R/4 as one of the operation parameters when the number of replicas is R. For example, when R=8, the number of replicas per group is 2.

In the processes of steps S2 and S3, the controller 30 divides the problem based on the determined operation parameters and sets a subproblem in each of the Ising machines 21 to 24.

In the processes of steps S4 and S5, the controller 30 sets operations for the Ising machines 21 to 24 and sets replica groups to be processed.

In the processing of step S6, the controller 30 instructs each of the Ising machines 21 to 24 to execute search processing. The controller 30 stands by until the search processing is completed in a case where the search processing in the unit period is not completed by all of the Ising machines 21 to 24 (step S7: NO), and the controller 30 proceeds to the processing of step S8 in a case where the search processing is completed (step S7: YES).

In the processing of step S8, the controller 30 instructs the Ising machines 21 to 24 to transfer the state to be a solution candidate and to perform postprocessing.

In the processing of step S9, the controller 30 receives E'(x) of the replica groups 0 to 3 and the state that is a solution candidate, which are calculated by each of the Ising machines 21 to 24 and calculates the total energy for each of the replica groups 0 to 3.

In a case where the predetermined search end condition is satisfied, the controller 30 determines that the entire search is completed (step S10: YES), instructs the optimization apparatus 20 to end the search (step S11), and ends the control of the optimization apparatus 20. In a case where the predetermined search end condition is not satisfied, the controller 30 determines that the entire search is not completed (step S10: NO) and repeats the processing from step S5.

For example, the controller 30 outputs the values of $x_1$ to $x_N$ when the minimum energy is obtained in all the groups as a solution to the problem until it is determined that the entire search is completed. The controller 30 outputs the obtained solution to, for example, the display 34a for display. Alternatively, the controller 30 may cause the obtained solution to be stored in the HDD 33 or transmit the obtained solution to another information processing apparatus via the network 37a.

The flow of an example of the operations by the optimization apparatus 10 illustrated in FIG. 3 may also be applied to the operations by the optimization apparatus 20. A flow of an example of the operations by the optimization apparatus 20 is briefly described below with reference to FIG. 3.

In the processing of step S20, the Ising machines 21 to 24 receive, for example, the index of each state variable of the state variable set corresponding to each subproblem, the initial values of $x_1$ to $x_N$, and the weight coefficient and bias coefficient used for the calculation of each subproblem from the controller 30. The received data is stored in the HBM (for example, the HBM 21c2 in FIG. 6) included in the Ising machines 21 to 24.

In processing of steps S21 and S22, the Ising machines 21 to 24 receive the number of repetitions of the search processing in the unit period, various operation parameters, and information indicating the replica group to be processed from the controller 30. The Ising machines 21 to 24 store these in a local memory (for example, the local memory 21c1 in FIG. 6).

In the processing of step S23, the Ising machines 21 to 24 accept an instruction to execute search processing from the controller 30 and perform the search processing of step S24.

The Ising machines 21 to 24 determine whether or not the search processing in the unit period is completed based on whether or not the search processing is performed by the number of repetitions (step S25). In a case where it is determined that the search processing in the unit period is not completed, the processing of step S24 is repeated. In a case where it is determined that the search processing in the unit period is completed, the processing of step S26 is performed.

In the processing of step S26, the Ising machines 21 to 24 notify the controller 30 that the search processing is completed. In the processing of steps S27 and S28, when the Ising machines 21 to 24 accept an instruction for state transfer and postprocessing from the controller 30, the Ising machines 21 to 24 transfer the state to be a solution candidate to the other Ising machines and the controller 30 and perform the postprocessing.

Thereafter, in the processing of step S29, the Ising machines 21 to 24 transmit E'(x) calculated in the postprocessing for each subproblem to the controller 30. In a case where there is an instruction to end the search from the controller 30 (step S30: YES), the Ising machines 21 to 24 end the search processing. In a case where an instruction to end the search is not received from the controller 30 (step S30: NO), the processing from step S22 is repeated.

Next, an operation example of the Ising machines 21 to 24 in a case where the processing order of the states in each of the replica groups 0 to 3 is fixed in the processing of step S5 described above is described.

Figure 9:
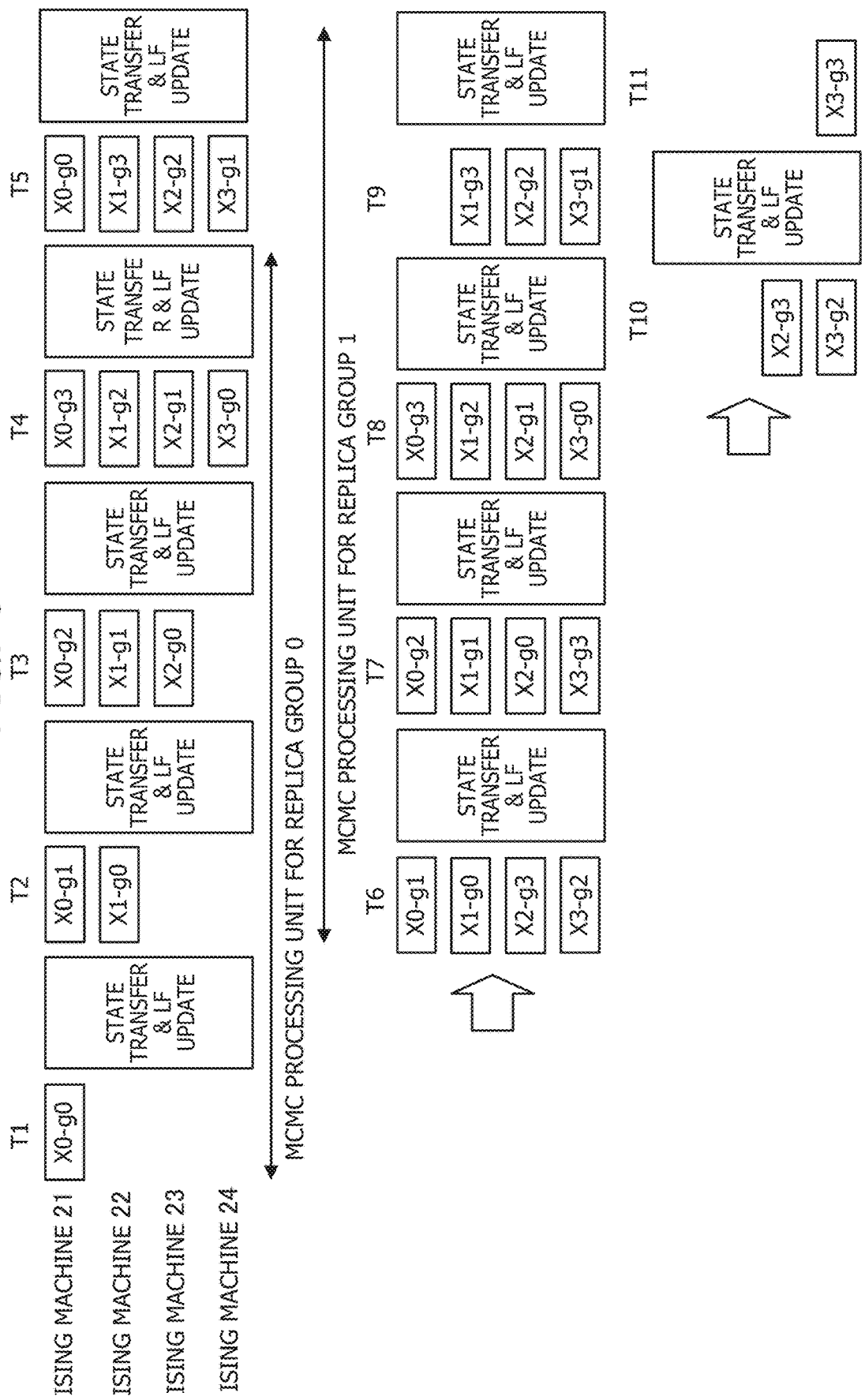
FIG. 9 is a diagram illustrating an example of operations by each Ising machine in a case where a processing order of states in each replica group is fixed.

FIG. 9 is a diagram illustrating an example of operations by each Ising machine in a case where the processing order of states in each replica group is fixed. In the example of FIG. 9, a search processing by the Harkov chain Monte Carlo method is performed in the order of X0, X1, X2, and X3 (the notation of "-g0", "-g1", "-g2", and "-g3" is omitted) in each of the replica groups 0 to 3.

In a first unit period T1, the Ising machine 21 performs search processing for X0-g0 that is a state of the replica group 0. When the search processing in the unit period T1 ends, the Ising machine 21 transfers X0-g0 to the Ising machines 22 to 24. The Ising machines 22 to 24 update (denoted as LF update in FIG. 9) the local fields (LF1-g0, LF2-g0, and LF3-g0) for the replica group 0 based on the received X0-g0.

In a next unit period T2, the Ising machine 21 performs search processing for X0-g1 that is a state of the replica group 1. In the unit period T2, the Ising machine 22 performs search processing for X1-g0 that is a state of the replica group 0. When the search processing in the unit period T2 ends, the Ising machine 21 transfers X0-g1 to the Ising machines 22 to 24 and the Ising machine 22 transfers X1-g0 to the Ising machines 21, 23, and 24. The Ising machines 21 to 24 update the local fields for the replica groups 0 and 1 based on the received X0-g1 or X1-g0.

In a unit period T3, the Ising machine 21 performs search processing for X0-g2 that is a state of the replica group 2 and the Ising machine 22 performs search processing for X1-g1 that is a state of the replica group 1. In the unit period T3, the Ising machine 23 performs search processing for X2-g0 that is a state of the replica group 0. When the search processing in the unit period T3 ends, the Ising machine 21 transfers X0-g2 to the Ising machines 22 to 24, and the Ising machine 22 transfers X1-g1 to the Ising machines 21, 23, and 24. The Ising machine 23 transfers X2-g0 to the Ising machines 21, 22, and 24. The Ising machines 21 to 24 update the local fields for the replica groups 0 to 2 based on the received X0-g2, X1-g1, or X2-g0.

In a unit period T4, the Ising machine 21 performs search processing for X0-g3 that is a state of the replica group 3 and the Ising machine 22 performs search processing for X1-g2 that is a state of the replica group 2. In the unit period T4, the Ising machine 23 performs search processing for X2-g1 that is a state of the replica group 1 and the Ising machine 24 performs search processing for X3-g0 that is a state of the replica group 0.

Figure 10:
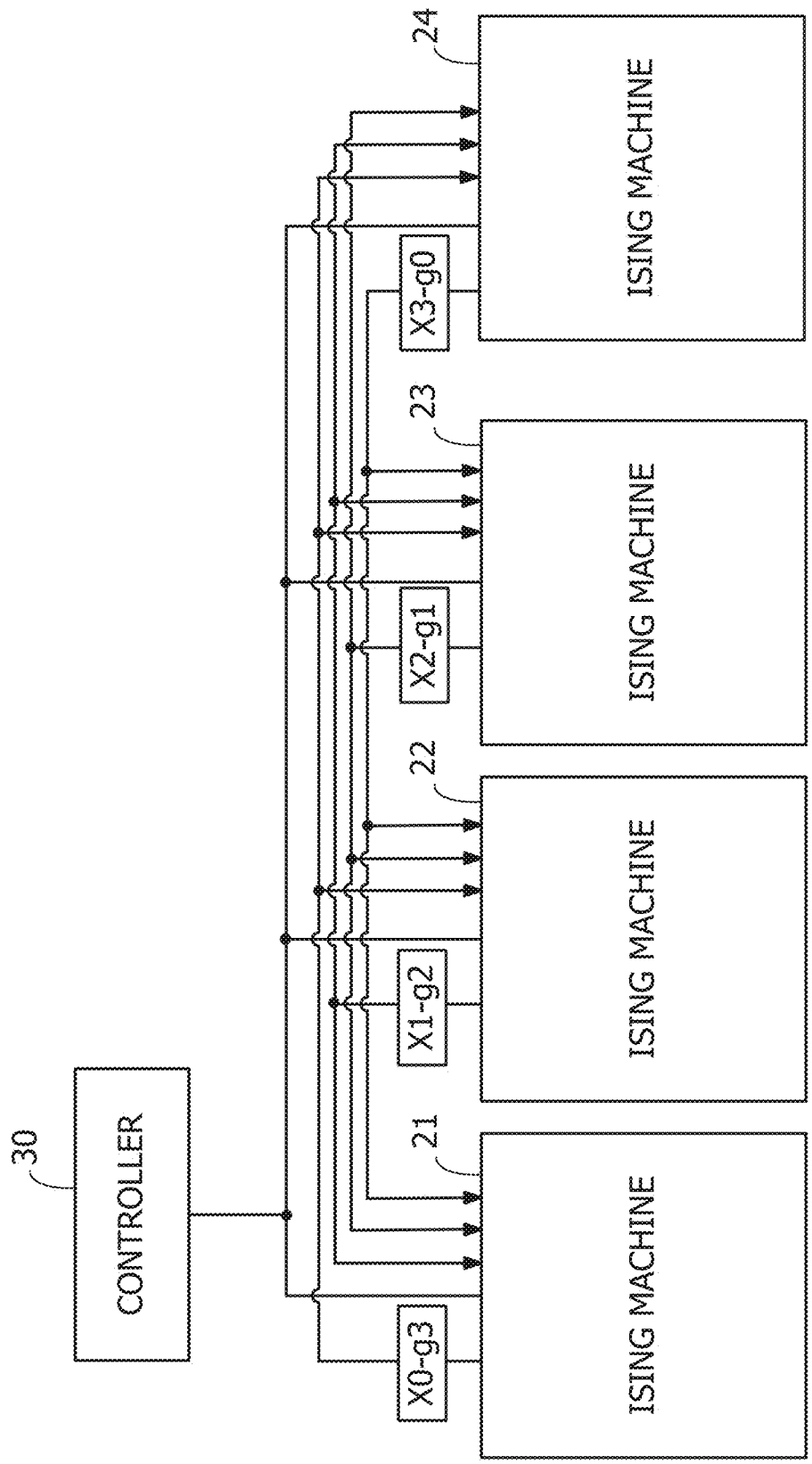
FIG. 10 is a diagram illustrating a transfer example of states after search processing in a unit period T4.

FIG. 10 is a diagram illustrating a transfer example of the states after search processing in the unit period T4.

The Ising machine 21 transfers X0-g3 to the Ising machines 22 to 24, and the Ising machine 22 transfers X1-g2 to the Ising machines 21, 23, and 24. The Ising machine 23 transfers X2-g1 to the Ising machines 21, 22, and 24, and the Ising machine 24 transfers X3-g0 to the Ising machines 21 to 23.

The Ising machines 21 to 24 update the local fields for the replica groups 0 to 3 based on the received X0-g3, X1-g2, X2-g1, or X3-g0.

By the above-described processing, the first search processing unit (denoted as the MCMC processing unit in FIG. 9) by the Markov chain Monte Carlo method for the replica group 0 ends. Thereafter, in each of the replica groups 0 to 3, each of the Ising machines 21 to 24 similarly performs search processing for each state in unit periods T5, T6, T7, T8, T9, T10, and T11 in the order of X0, X0, X2, and X3. The first MCMC processing unit for the replica group 1 ends with the state transfer and the update of local fields after the search processing in the unit period T5. Although not illustrated, the first MCMC processing unit for the replica group 2 ends with the state transfer and the update of local fields after the search processing in the unit period T6. The first MCMC processing unit for the replica group 3 ends with the state transfer and the update of local fields after the search processing in the unit period T7. In the example of FIG. 9, each of the replica groups 0 to 3 is processed two times, and the entire search ends by ending the search processing in the unit period T11.

As illustrated in FIG. 9, the Ising machines 21 to 24 perform search processing for the state corresponding to each subproblem in a pipeline manner in a replica group unit. In the unit periods T4 to T8, the search processing for the states of the replica groups 0 to 3 is executed in parallel by using all the Ising machines 21 to 24.

Accordingly, each of the Ising machines 21 to 24 efficiently operates and the calculation efficiency may be improved. Accordingly, the solution searching performance of the optimization apparatus 20 for a large-scale problem is improved. Since the update of the value of the state variable is sequentially performed in each of the replica groups 0 to 3, the principle of energy minimization of the Ising model by the Markov chain Monte Carlo method is satisfied.

Next, an operation example of the Ising machines 21 to 24 in a case where the processing order of the states in each of the replica groups 0 to 3 is changed in the MCMC processing unit in the processing of step S5 described above is described.

Figure 11:
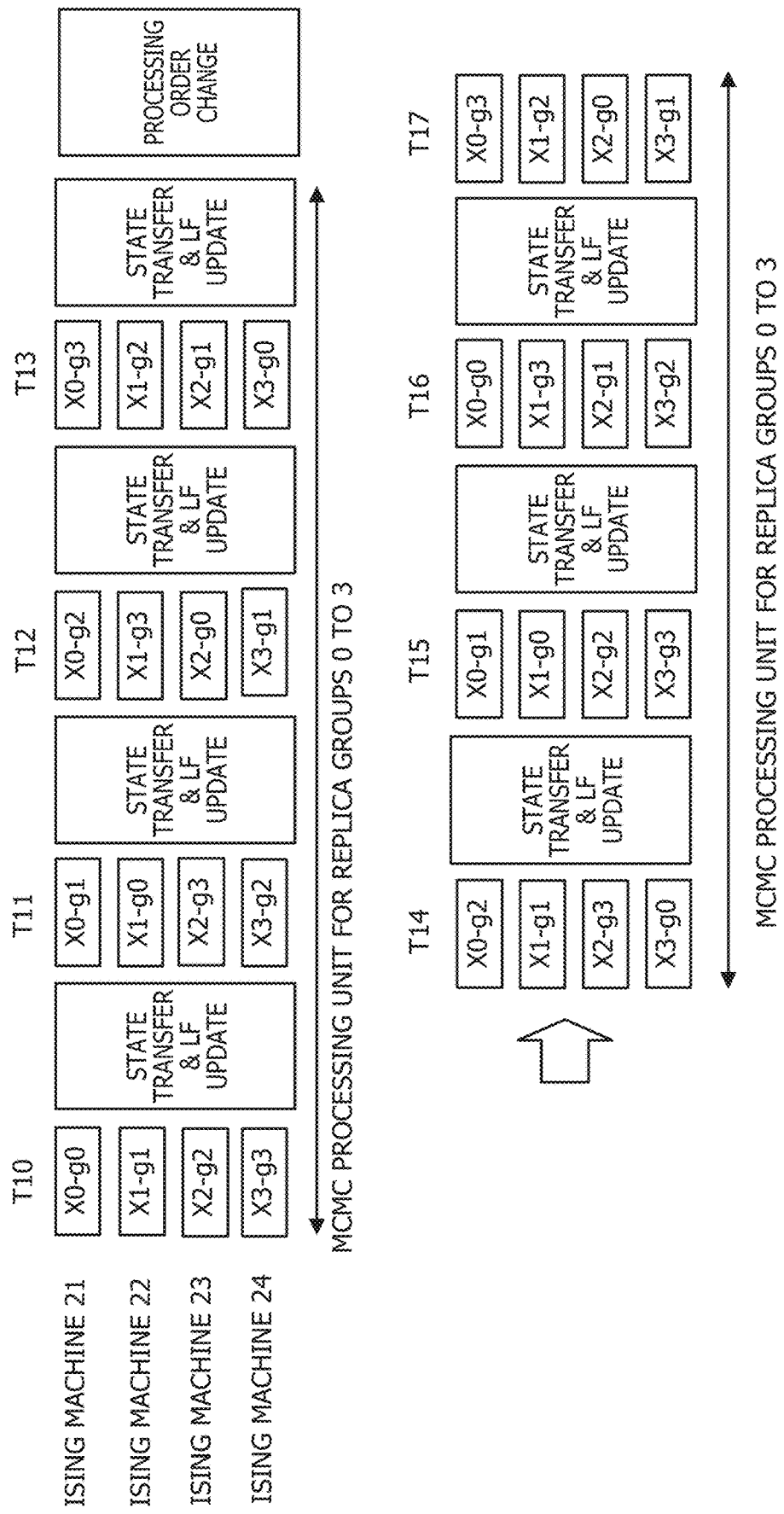
FIG. 11 is a diagram illustrating an example of operations by each Ising machine in a case where a processing order of states in each replica group is changed in a MCMC processing unit.

FIG. 11 is a diagram illustrating an example of operations by each Ising machine in a case where the processing order of states in each replica group is changed in the MCMC processing unit.

Figure 12:
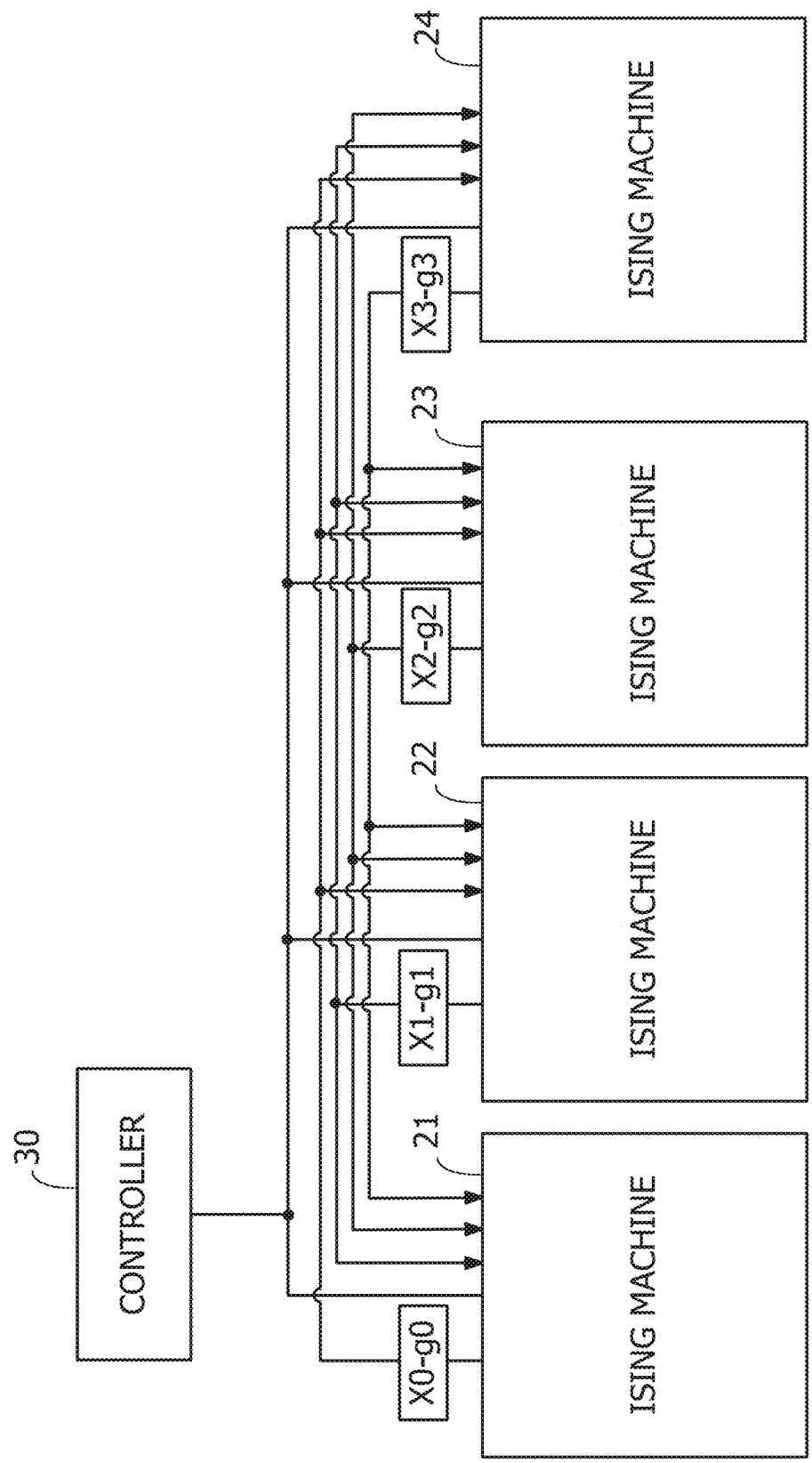
FIG. 12 is a diagram illustrating a transfer example of states after search processing in a unit period T10.

In the first unit period T10, the Ising machine 21 performs search processing for X0-g0 that is a state of the replica group 0 and the Ising machine 22 performs search processing for X1-g1 that is a state of the replica group 1. In the unit period T10, the Ising machine 23 performs search processing for X2-g2 that is a state of the replica group 2 and the Ising machine 24 performs search processing for X3-g3 that is a state of the replica group 3, FIG. 12 is a diagram illustrating a transfer example of the states after search processing in the unit period T10.

The Ising machine 21 transfers X0-g0 to the Ising machines 22 to 24, and the Ising machine 22 transfers X1-g1 to the Ising machines 21, 23, and 24. The Ising machine 23 transfers X2-g2 to the Ising machines 21, 22, and 24, and the Ising machine 24 transfers X3-g3 to the Ising machines 21 to 23.

The Ising machines 21 to 24 update the local fields for the replica groups 0 to 3 based on the received X0-g0, X1-g1, X2-g2, or X3-g3.

In the unit period T11, the Ising machine 21 performs search processing for X0-g1 that is a state of the replica group 1 and the Ising machine 22 performs search processing for X1-g0 that is a state of the replica group 0. In the unit period T11, the Ising machine 23 performs search processing for X2-g3 that is a state of the replica group 3 and the Ising machine 24 performs search processing for X3-g2 that is a state of the replica group 2.

When the processing in the unit period T11 ends, the Ising machine 21 transfers X0-g1 to the Ising machines 22 to 24 and the Ising machine 22 transfers X1-g0 to the Ising machines 21, 23, and 24. The Ising machine 23 transfers X2-g3 to the Ising machines 21, 22, and 24, and the Ising machine 24 transfers X3-g2 to the Ising machines 21 to 23.

The Ising machines 21 to 24 update the local fields for the replica groups 0 to 3 based on the received X0-g1, X1-g0, X2-g3, or X3-g2.

In a unit period T12, the Ising machine 21 performs search processing for X0-g2 that is a state of the replica group 2 and the Ising machine 22 performs search processing for X1-g3 that is a state of the replica group 3. In the unit period T12, the Ising machine 23 performs search processing for X2-g0 that is a state of the replica group 0 and the Ising machine 24 performs search processing for X3-g1 that is a state of the replica group 1.

When the processing in the unit period T12 ends, the Ising machine 21 transfers X0-g2 to the Ising machines 22 to 24 and the Ising machine 22 transfers X1-g3 to the Ising machines 21, 23, and 24. The Ising machine 23 transfers X2-g0 to the Ising machines 21, 22, and 24, and the Ising machine 24 transfers X3-g1 to the Ising machines 21 to 23.

The Ising machines 21 to 24 update the local fields for the replica groups 0 to 3 based on the received X0-g2, X1-g3, X2-g0, or X3-g1.

In a unit period T13, the Ising machine 21 performs search processing for X0-g3 that is a state of the replica group 3 and the Ising machine 22 performs search processing for X1-g2 that is a state of the replica group 2. In the unit period T13, the Ising machine 23 performs search processing for X2-g1 that is a state of the replica group 1 and the Ising machine 24 performs search processing for X3-g0 that is a state of the replica group 0.

When the processing in the unit period T13 ends, the Ising machine 21 transfers X0-g3 to the Ising machines 22 to 24 and the Ising machine 22 transfers X1-g2 to the Ising machines 21, 23, and 24. The Ising machine 23 transfers X2-g1 to the Ising machines 21, 22, and 24, and the Ising machine 24 transfers X3-g0 to the Ising machines 21 to 23.

The Ising machines 21 to 24 update the local fields for the replica groups 0 to 3 based on the received X0-g3, X1-g2, X2-g1, or X3-g0.

By the above-described processing, the first MCMC processing unit for each of the replica groups 0 to 3 ends. In the first MCMC processing unit, the processing order of states is X0, X1, X2, and X3 in the replica group 0 and is X1, X0, X3, and X2 in the replica group 1. The processing order of states is X2, X3, X0, and X1 in the replica group 2 and is X3, X2, X1, and X0 in the replica group 3.

When the first MCMC processing unit ends, the controller 30, for example, randomly changes the processing order of states in each of the replica groups 0 to 3. In the processing in unit periods T14, T15, T16, and T17 in FIG. 11, it is indicated that the processing order of states is changed as follows. For example, the processing order of states after the change is X3, X1, X0, and X2 in the replica group 0 and is X1, X0, X2, and X3 in the replica group 1. The processing order of states after the change is X0, X2, X3, and X1 in the replica group 2 and is X2, X3, X1, and X0 in the replica group 3.

Even after the change, in the same unit period, the Ising machines 21 to 24 each perform search processing for the states of different replica groups. Hence, since the update of the value of the state variable is sequentially performed in each of the replica groups 0 to 3, the principle of energy minimization of the Ising model by the Harkov chain Monte Carlo method is satisfied.

By changing the processing order of X0 to X3 (corresponding to the processing order of four subproblems) rather than fixing the processing order, for example, to have randomness, the bias of search may be reduced. Therefore, further improvement in the solution searching performance of the optimization apparatus 20 may be expected.

As described above, the processing details may be realized by causing the controller 30 to execute a program.

The program may be recorded on a computer-readable recording medium (such as the recording medium 36a). As the recording medium, for example, a magnetic disk, an optical disk, a magneto-optical disk, a semiconductor memory, and the like may be used. The magnetic disk includes an FD and an HDD. The optical disk includes a CD, a CD-recordable (R)/rewritable (RW), a DVD, and a DVD-R/RW. The program may be recorded and distributed on a portable recording medium. In that case, the program may be copied from the portable recording medium to another recording medium (such as the HDD 33) and executed.

In an aspect, the embodiments may improve the calculation efficiency in an optimization apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization apparatus, comprising:
   a plurality of Ising machines that each search for a solution of a subproblem among a plurality of subproblems obtained by dividing a problem represented by an Ising model in a pipeline manner,
   each of the plurality of Ising machines including:
   a memory configured to store values of a state variable set corresponding to a subproblem to be calculated for each group of a plurality of groups;
   a processor coupled to the memory and the processor configured to:
   perform processing of calculating a first solution candidate for each group of the plurality of groups by a corresponding Ising machine of the plurality of Ising machines;
   changing each group processed by each Ising machine of the plurality of Ising machines to another group of the plurality of groups to be processed every unit period;
   perform processing of calculating a second solution candidate for each group of the plurality of groups by each Ising machines of the plurality of Ising machines based on the first solution candidates of subproblems calculated by other Ising machines such that the second solution candidate is calculated for the state variable set of the another group different from groups processed by the other Ising machines in a same unit period, such that processing is executed in parallel;
   and
   a communication circuit configured to transmit the second solution candidate to the other Ising machines every time the unit period ends.

2. The optimization apparatus according to claim 1, wherein
   the processor is further configured to:
   calculate a change in energy of the Ising model due to a change in a value of any one of state variables included in the state variable set while fixing values of the first solution candidates calculated by the other Ising machines.

3. The optimization apparatus according to claim 1, wherein
   a processing order of the state variable set corresponding to each subproblem in a same group processed by the plurality of Ising machines is changed at predetermined processing timing.

4. The optimization apparatus according to claim 1, wherein
   the processor is further configured to:
   perform the processing as a plurality of replicas that respectively calculate the second solution candidate for the plurality of groups.

5. An optimization method executed by a plurality of computers that each search for a state variable set corresponding to a subproblem among a plurality of subproblems obtained by dividing a problem represented by an Ising model in a pipeline manner, the optimization method comprising:
   storing values of a state variable set corresponding to a subproblem to be calculated for each group of a plurality of groups;
   performing, by each of the plurality of computers, processing of calculating a first solution candidate for each group of a plurality of groups by a corresponding computer of the plurality of computers;
   changing each group processed by each Ising machine of the plurality of Ising machines to another group of the plurality of groups to be processed every unit period;
   performing, by each of the plurality of computers, processing of calculating a second solution candidate of the subproblem for each group of a plurality of groups based on first solution candidates of subproblems calculated by other computers such that the second solution candidate is calculated for the state variable set of the another group different from groups processed by the other computers in a same unit period, such that processing is executed in parallel;
   and
   transmitting the second solution candidate to the other computers every time the unit period ends.

6. A non-transitory computer-readable recording medium having stored therein a program that causes each of computers, which searches for a state variable set corresponding to a subproblem among a plurality of subproblems obtained by dividing a problem represented by an Ising model in a pipeline manner, to execute a process, the process comprising:
   retrieving stored values of a state variable set corresponding to a subproblem to be calculated for each group of a plurality of groups;
   performing, by each of the computers, processing of calculating a first solution candidate for each group of a plurality of groups by a corresponding computer of the plurality of computers;
   changing each group processed by each Ising machine of the plurality of Ising machines to another group of the plurality of groups to be processed every unit period;
   performing, by each of the computers, processing of calculating a second solution candidate of the subproblem for each group of the plurality of groups based on the first solution candidates of subproblems calculated by other computers such that the second solution candidate is calculated for the state variable set of the another group different from groups processed by the other computers in a same unit period, such that processing is executed in parallel;
   and
   transmitting the second solution candidate to the other computers every time the unit period ends.

7. The optimization method according to claim 6, further comprising:
   calculating a change in energy of the Ising model due to a change in a value of any one of state variables included in the state variable set while fixing values of the first solution candidates calculated by the other Ising machines.

8. The optimization method according to claim 5, further comprising:
changing a processing order of the state variable set corresponding to each subproblem in a same group processed by the plurality of Ising machines at predetermined processing timing.

9. The optimization method according to claim 5, further comprising:
performing the processing as a plurality of replicas that respectively calculate the second solution candidate for the plurality of groups.

10. The optimization method according to claim 5, wherein processing is executed using all of the plurality of Ising machines.

11. The optimization method according to claim 5, further comprising:
changing a processing order of the state variable set corresponding to each subproblem in the same group at a predetermined processing timing; and
setting the processing order of different groups to be processed among the Ising machines in the same unit period.

12. The optimization method according to claim 11, changing the processing order is determined randomly.

13. The optimization method according to claim 5, further comprising fixing a processing order of the state variable set corresponding to each subproblem in the same group.

14. The optimization apparatus according to claim 1, wherein processing is executed using all of the plurality of Ising machines.

15. The optimization apparatus according to claim 1, further comprising:
changing a processing order of the state variable set corresponding to each subproblem in the same group at a predetermined processing timing; and
setting the processing order of different groups to be processed among the Ising machines in the same unit period.

16. The optimization apparatus according to claim 15, changing the processing order is determined randomly.

17. The optimization apparatus according to claim 1, wherein a processing order of the state variable set corresponding to each subproblem in the same group is fixed.

18. The non-transitory computer-readable recording medium according to claim 6, wherein processing is executed in all of the computers.

19. The non-transitory computer-readable recording medium according to claim 6, wherein the process further comprises:
changing a processing order of the state variable set corresponding to each subproblem in the same group at a predetermined processing timing; and
setting the processing order of different groups to be processed among the Ising machines in the same unit period.

20. The non-transitory computer-readable recording medium according to claim 6, wherein process further comprises fixing a processing order of the state variable set corresponding to each subproblem in the same group.

* * * * *